United States Patent [19]

Doetsch et al.

[11] Patent Number: 5,478,488
[45] Date of Patent: Dec. 26, 1995

[54] DETERGENT COMPOSITION CONTAINING ALKALI METAL PEROXYSALT STABILIZED WITH ALKALI METAL SULFATE AND CHLORIDE

[75] Inventors: Werner Doetsch; Manfred Mathes, both of Bad Hoenningen; Gerd Hecken, Vettelschoss, all of Germany

[73] Assignee: Solvay Interox GmbH, Pullach, Germany

[21] Appl. No.: 239,550

[22] Filed: May 6, 1994

[30] Foreign Application Priority Data

May 8, 1993 [DE] Germany .................. 43 15 380.1

[51] Int. Cl.⁶ .................. C11D 17/00; C11D 3/08; C11D 3/10; C11D 3/39
[52] U.S. Cl. .................. 252/95; 252/99; 252/135; 252/174.13; 252/186.32; 252/186.43; 427/215; 428/403; 423/274
[58] Field of Search ............... 252/95, 99, 135, 252/174.13, 186.3, 186.32, 186.43; 427/215; 423/415.2, 274; 428/403

[56] References Cited

U.S. PATENT DOCUMENTS

| | | | |
|---|---|---|---|
| 3,979,312 | 9/1976 | Nakagawa et al. | 252/99 |
| 4,105,827 | 8/1978 | Brichard et al. | 428/403 |
| 4,174,411 | 11/1979 | Saeman et al. | 427/214 |
| 4,321,301 | 3/1982 | Brichard et al. | 428/403 |
| 4,325,933 | 4/1982 | Matsumoto et al. | 423/415 P |
| 4,400,367 | 8/1983 | Doetsch et al. | 423/463 |
| 4,526,698 | 7/1985 | Kuroda et al. | 252/99 |
| 4,830,773 | 5/1989 | Olson | 252/174.13 |
| 4,933,102 | 6/1990 | Olson | 252/174 |
| 5,346,680 | 9/1994 | Roesler et al. | 423/274 |

FOREIGN PATENT DOCUMENTS

| | | |
|---|---|---|
| 2530539 | 1/1976 | Germany . |
| 61-077607 | 4/1986 | Japan . |
| 1469352 | 4/1977 | United Kingdom . |
| 1538893 | 1/1979 | United Kingdom . |

*Primary Examiner*—Paul Lieberman
*Assistant Examiner*—Lorna M. Douyon
*Attorney, Agent, or Firm*—Evenson, McKeown, Edwards & Lenahan

[57] ABSTRACT

Particulate alkali metal peroxy salts are stabilized by coating with a crystallized mineral salt mixture of alkali metal sulfate and alkali metal chloride which optionally may additionally contain alkali metal silicate. Particularly suitable alkali metal peroxy salts include peroxypyrophosphate, peroxytripolyphosphate, peroxymonosulfate and peroxycarbonate. The coated peroxy salts are incorporated in bleaching and detergent compositions.

13 Claims, No Drawings

DETERGENT COMPOSITION CONTAINING ALKALI METAL PEROXYSALT STABILIZED WITH ALKALI METAL SULFATE AND CHLORIDE

BACKGROUND OF THE INVENTION

This invention relates to a process for stabilizing particulate alkali metal peroxy salts selected from the group consisting of peroxycarbonates, peroxypyrophosphates, peroxytripolyphosphates and/or peroxymonosulfates, by coating the salts with a solid coating material. The invention also relates to resulting particulate alkali metal peroxy salts which are stabilized by the applied coating.

It is well known that peroxy compounds can be used as bleaching compounds in powdered detergent mixtures. Sodium perborate tetrahydrate or sodium perborate monohydrate are usually used as bleaching agents in common household detergents, since these materials are relatively resistant to decomposition in a pure detergent medium. However, other alkali metal peroxy salts, particularly peroxycarbonate (i.e. percarbonate or PCS), are also being used with increasing frequency. Although these alkali metal peroxy salts, and percarbonate in particular, are stable in the pure dry state, they have the disadvantage that they readily decompose in the presence of moisture with consequent loss of active oxygen.

It has been suggested in the prior art to overcome this disadvantage of the alkali metal peroxy salts by coating the peroxy compound with stabilizing materials or mineral protective films. The suggested solutions of the prior art are described in further detail hereinafter by means of the example of percarbonate, e.g. sodium percarbonate (PCS).

In U.S. Pat. No. 4,526,698 the use of a borate is suggested as coating agent for coating percarbonate, which borate may optionally additionally contain an alkali metal silicate. A similar coating material of different boric acids which, if necessary, may also contain alkali metal silicate is described in U.S. Pat. No. 4,321,301. Apart from these attempted solutions of using boron compounds and alkali metal silicates, coating materials of mineral salts have also been recommended according to the state of the art. U.S. Pat. No. 4,325,933, for example, describes the coating of sodium percarbonate with alkaline earth metal salts which are applied onto the sodium percarbonate particles from an aqueous solution. U.S. Pat. No. 4,105,827 and Published United Kingdom Patent Application No. GB 1,538,893, moreover, describe the stabilization of alkali metal peroxy salts by coating with a mineral protective film of sodium carbonate with other mineral salts, in particular sodium sulfate; according to Published United Kingdom Patent Application No. GB 1,538,893, this mineral coating layer can additionally contain sodium silicate.

Although the above attempted solutions according to the state of the art provide a substantial improvement in the stability of alkali metal peroxy salts such as sodium percarbonate, the problems, particularly as regards sodium percarbonate, are not solved in a desirable manner by the solutions suggested according to the state of the art. This is attributable in particular to the fact that percarbonate, for example, can never be completely dry since, apart from the residual water from the production process, water is always formed spontaneously in the PCS itself as a result of the decomposition of hydrogen peroxide. In the case of PCS, it should moreover also be taken into account that it is not a clearly defined homogenous compound but always represents a mixture of compounds, some of which contain water of hydration, with the following formulae:

$Na_2CO_3 . 1.5 H_2O$
$Na_2CO_3 . 1.5 H_2O . H_2O$
$Na_2CO_3 . 2 H_2O . H_2O$
$Na_2CO_3 . 2 H_2O$
$Na_2CO_3 . X H_2O$

The moisture which adversely affects the stability of PCS therefore not only originates from the base powder which introduces a substantial proportion of the moisture into the detergent composition via the individual components such as zeolite, linear alkyl sulfonates, soap, carboxymethyl cellulose, soda, optical brighteners etc. but a certain proportion of the harmful moisture thus originates from the percarbonate itself. An optimum coating layer for alkali metal peroxy salts, in particular for percarbonate must therefore be capable not only of keeping moisture from the percarbonate on the outside in the form of a dense protective film but it must simultaneously be capable of sufficiently firmly bonding the moisture resulting in the percarbonate itself from the water of crystallization and/or the decomposition. In addition, the coating material should not reduce the rate of dissolution of the alkali metal peroxy salt to any major extent as is frequently observed in the case of coating layers with a high alkali metal silicate content according to the state of the art.

SUMMARY OF THE INVENTION

The object of the invention was to provide a new coating material for particulate peroxy compounds which provides these particles with increased stability during prolonged storage and in particular during storage in the presence of other detergent constituents.

This task was achieved by the coated particulate alkali metal peroxy salts as detailed in the patent claims and the process for the production of these coated particulate alkali metal peroxy salts.

DETAILED DESCRIPTION OF PREFERRED EMBODIMENTS

The coated particulate alkali metal peroxy salt according to the invention consists of a nucleus which contains essentially an alkali metal peroxy salt from the group of peroxycarbonate (percarbonate), peroxypyrophosphate, peroxytripolyphosphate and/or peroxymonosulfate and a coating layer surrounding the nucleus, the coating material of which is essentially a mineral salt mixture formed from alkali metal sulfate and alkali metal chloride by joint crystallization. A preferred particulate alkali metal peroxy salt coated according to the invention is the peroxycarbonate, in particular sodium percarbonate. Moreover, in preferred particulate alkali metal peroxy salts coated according to the invention, the alkali metal of the sulfate or chloride in the coating material is sodium or potassium. According to this embodiment of the invention, the coating layer is thus formed from a mineral salt mixture which is formed by joint crystallization from sodium or potassium sulfate on the one hand and sodium or potassium chloride on the other hand.

The above-mentioned particles according to the invention are surprisingly satisfactorily stabilized by the coating layer of the mineral salt mixture of alkali metal sulfate and alkali metal chloride (hereinafter called alkali metal sulfate chloride). This result according to the invention is all the more surprising as the coating layer consists of simple alkali metal salts whose individual components as such, i.e. the alkali metal sulfate or the alkali metal chloride, like coating layers according to the nearest state of the art (such as those of sodium carbonate or sodium carbonate/sodium sulfate) have no such stabilizing effect. Without determining any specific theory or providing a limiting explanation to the invention, a possible explanation of the stabilizing effect of the coating layer of alkali metal sulfate chloride according to the invention is that the alkali metal sulfate chloride is basically capable of forming clathrate. As a result of the alkali metal sulfate chloride, both moisture (e.g. that resulting from the detergent components) which acts externally onto the alkali metal peroxy salt particle and the water of crystallization originating from inside the alkali metal peroxy salt particle itself as well as hydrogen peroxide is firmly bonded, during the formation of clathrate, by incorporation into the crystal lattice positions of the clathrate. During this process, the water is more firmly bonded than normal water of crystallization which is present for example also in the coating layer according to the state of the art, e.g. of sodium carbonate or sodium carbonate/sodium sulfate. A particular advantage of the formation of clathrate is that the hydrogen peroxide partly liberated during storage from the alkali metal peroxy salt is trapped highly satisfactorily by the alkali metal sulfate chloride coating layer and can be firmly bonded. In this way the decomposition of hydrogen peroxide from the peroxy salt which otherwise takes place with loss of active oxygen and the formation of water and negatively affects the quality of the product is effectively prevented.

Although the controlled production and the crystal structure of the clathrates of alkali metal sulfate and alkali metal chloride has already been described according to the state of the art, e.g. in *J.C.S. Chem. Comm.*, 1978, 288–289 or in U.S. Pat. No. 4,400,367, these descriptions do not provide any indication regarding the particular suitability of alkali metal sulfate-chloride for use as a coating layer material for moisture-sensitive alkali metal peroxy salts. In particular, they contain no indication regarding the fact that, as a result of the clathrate formation assumed here for the clarification of the stabilizing effect of the coating layer according to the invention, the alkali metal sulfate chlorides are particularly suitable for coating these alkali metal peroxy salts. It is, moreover, surprising that the formation of clathrate obviously takes place under completely standard conditions such as those present during the storage of detergent compositions, without any special controlled production conditions being maintained and that the special stabilizing effect of the coating layer material according to the invention is able to take effect under these conditions. Another surprising advantage consists in that as a result of the formation of clathrate, water of crystallization or water attributable to moisture or hydrogen peroxide on the one hand, are firmly bonded by the coating material during the storage of the alkali metal peroxy salts coated according to the invention and, on the other hand, the water solubility and the rate of dissolution of the alkali metal peroxy salts are not reduced by the coating according to the invention. The coated alkali metal peroxy salt particles according to the invention consequently have advantageous technical properties for application which cannot always be achieved in this way when moisture-repellent coating materials according to the state of the art are used.

Although the ratio of alkali metal sulfate to alkali metal chloride in the coating material can vary within a wide molecular ratio range, molar ratios of alkali metal sulfate to alkali metal chloride of approximately 1:1 to approximately 8:1 are appropriate since it is assumed that optimum conditions for clathrate formation arise in this region. Molar ratios of alkali metal sulfate to alkali metal chloride of approximately 3:1 to approximately 5:1 are preferred.

The minimum amount of solid coating material in the particulate alkali metal peroxy salts coated according to the invention corresponds essentially to the amount necessary to coat the particles virtually completely. The upper limit for the amount of solid coating material is determined essentially by the aim of reducing the active oxygen content in the particles to be stabilized not unnecessarily by excess coating material. For this reason, an amount of solid coating material, based on the weight of the particles of alkali metal peroxy salt to be coated, of 1 to 10% by weight is therefore most appropriate. Using a coating layer of 1% by weight, a coating suitable for stabilizing the particles is usually assured, depending on the surface properties of the alkali metal peroxy salt particles. An amount of solid coating material of more than 10% by weight has not proved particularly appropriate since this unnecessarily reduces not only the active oxygen content of the alkali metal peroxy salt compound but has also been observed to increase the tendency of the coated particles to cake together. In particularly advantageous particles, the quantity of solid coating material amounts to at least 3% by weight, in particular 3 to 8% by weight, based on the alkali metal peroxy salt particles to be coated. In this range, complete and optimum coating of the alkali metal peroxy salt is assured.

According to a variation of the invention, the particulate alkali metal peroxy salts coated according to the invention are characterized in that, in addition to the mineral salt mixture, the coating material contains an alkali metal silicate in the dispersed state in an amount of up to 50% by weight, preferably up to 25% by weight, based on the weight of the total solid coating material. This variation of the alkali metal peroxy salt particles according to the invention combines the advantages of the coating layer according to the invention with the advantages of the alkali metal silicate coating material already known according to the state of the art, the disadvantages of a pure alkali metal silicate coating material being avoided. In this way, the alkali metal silicate content of the coating layer of alkali metal sulfate and alkali metal chloride according to the invention results in an increased resistance to attrition of the alkali metal peroxy salt particles according to the invention without negatively affecting the rate of dissolution of the particles according to the invention as is partly the case with the coating layers with a high alkali metal silicate content according to the state of the art. As a result of the increased resistance to attrition and the fact that the rate of dissolution is not reduced, the particles according to the invention provide advantages for compounding detergents without advantageous properties (e.g. solution properties) being negatively affected.

According to another variation, the coated particulate alkali metal peroxy salt is characterized in that the coating layer consists of an inner layer of mineral metal salt mixture, which surrounds the nucleus, which mixture may contain alkali metal silicate dispersed therein, and an additional outer covering layer of an alkali metal silicate. The quantity of alkali metal silicate in the solid covering layer is within a range of up to 5% by weight, preferably up to 2% by weight, based on the alkali metal peroxy salt particles to be coated. According to this variation, the advantages of the alkali metal silicate coating material as regards resistance to attrition are also exploited. In contrast to a pure alkali metal silicate coating layer according to the state of the art, the covering layer of alkali metal silicate according to this variation of the invention can be very thin. In addition, it is not necessary for a closed alkali metal silicate covering layer to be present since this covering layer essentially serves merely the purpose of increasing the resistance to attrition, and the stabilization against moisture is already provided by the mineral salt mixture coating layer according to the invention underneath.

Suitable alkali metal silicates for the above two variations of the coated particulate alkali metal peroxy salts according to the invention are for example sodium and potassium water glass with different alkali oxide:SiO$_2$ ratios, in particular 1 mole alkali oxide to 2–4 moles SiO$_2$.

Although it is possible according to the invention to stabilize any desired alkali metal peroxy salts by coating with the mineral salt mixture coating layer, it being possible for the particles of the peroxy compound to be stabilized to contain a single peroxy salt or a mixture of peroxy salts, the invention is directed to particular advantage at the stabilization of sodium peroxy carbonate (sodium percarbonate). The peroxy salts may contain small quantities of different common additives which generally do not exceed 10% by weight of the material. Additives of this type include, for example, stabilizers such as alkali metal or magnesium silicates, magnesium sulfate, phosphates (e.g. metaphosphate), organic stabilizers such as quinolinic acid, salicylic acid or dipicolinic acid (DPA), chelating agents such as 8-oxyquinoline or ethylene diamine tetraacetic acid (EDTA), phosphonic acid derivatives such as methylene or amino methylene phosphonic acids or their salts, in particular 1-hydroxy ethylidene diphosphonic acid (HEDP) and small quantities of the usual wetting agents.

The peroxy compounds on which the particulate alkali metal peroxy salts coated according to the invention, and particularly the coated percarbonate, are based can have been produced according to any process known according to the state of the art. Such processes for producing alkali metal peroxy salts comprise in particular spray-drying processes, fluid bed processes and so-called dry processes. During the dry processes in particular, heavy particles are obtained which, after coating with a mineral salt mixture of alkali metal sulfate and alkali metal chloride according to the invention, are advantageously suitable for use in compact detergents and cleaning agents.

Accordingly, the coated particulate alkali metal peroxy salts according to the invention can generally be used in detergents or bleaching agents, particularly in compact detergents or compact bleaching agents.

The invention also relates to a process for producing the particulate alkali metal peroxy salts stabilized according to the invention by coating with a solid coating layer, the coating material of which is essentially a mineral salt mixture. This process according to the invention is characterized in that a mineral salt mixture is used as coating material which was formed by joint crystallization of alkali metal sulfate and alkali metal chloride, while an alkali metal silicate optionally was additionally dispersed in this mineral salt mixture in an amount of up to 50% by weight, preferably up to 25% by weight, based on the weight of a total solid coating material. This process for producing the coated particulate alkali metal peroxy salts according to the invention is carried out by treating the particles of the peroxy salts with an aqueous system (coating agent) containing the components of the coating material, and then evaporating the water in order to dry the treated particles. According to this method, a coating layer is produced on the surface of the alkali metal peroxy salt particles by crystallization, which coating layer consists of mixed compounds of alkali metal sulfate and alkali metal chloride and in which alkali metal silicate is optionally dispersed.

The concentration in which the various components of the coating material are contained in the coating agent is preferably at least equivalent to saturation concentration under the conditions of application. The aqueous coating agent is preferably so highly concentrated that a supersaturation is already present. As a rule, no clear aqueous solution is present but rather systems ranging from a turbid colloidal aqueous one (emulsion, dispersion) to a finely particulate suspension or brine. In this case, only a minimum amount of water has to be evaporated subsequently.

The temperature at which the particles are treated with the coating agent and the water is evaporated is selected as a function of the type of the peroxy compound to be treated. The treatment of the alkali metal peroxy salt particles with the coating agent is generally carried out at a temperature which is slightly below, at or slightly above the temperature of the particles to be coated, in particular at a coating agent temperature which is between the temperature of the particles to be coated and a temperature of up to 25° C. above or below the temperature of the particles to be coated. When these measures are carried out, the particles of the peroxy compound are appropriately maintained at a temperature which is below the decomposition temperature of the peroxy compound and in general below 90° C. During the evaporation of the water to dry the particles, the temperature is generally between 30° and 80° C.

The coating layer can be applied either by a batch method or by a continuous method. If a batch method is used, the peroxy salt particles can, for example, be treated in a suitable mixer, e.g. a Lodige (plow share) mixer, and subsequently passed to the drying stage (e.g. a fluid bed dryer). It is also possible to spray the peroxy salt particles in a fluid bed with the solution of the coating material components. In this case, the evaporation of the water can be carried out simultaneously in the fluid bed and dry coated particles produced in one step. This fluid bed process is carried out in the usual way and can be designed as a continuous process. According to a preferred embodiment of the process for producing the coated alkali metal peroxy salt according to the invention, the coating material of alkali metal sulfate and alkali metal chloride and optional additional alkali metal silicate is applied to the particulate alkali metal peroxy salt in a ring layer mixer. In such a ring layer mixer, the particles to be coated are mixed at a rotational speed of, in particular, 1500 to 1800 rpm within a ring layer on the wall of the ring layer mixer and treated with the aqueous coating agent with intensive mixing action.

The resulting damp product in the ring layer mixer is subsequently dried in a conventional manner, e.g. in a fluid bed drier. The production process using the ring layer mixer is preferred since it is an effective method and, compared with other methods, leads to better results, in particular to products with a more homogenous coating.

According to a modification of the above process for producing the stabilized particulate alkali metal peroxy salts by coating with a solid coating layer, the coated particulate alkali metal peroxy salts according to the invention which contain an additional coating layer of alkali metal silicate are prepared in such a way that, initially, a coated particulate alkali metal peroxy salt is produced according to one of the processes indicated above with an inner layer, surrounding the nucleus, of alkali metal sulfate and alkali metal chloride and optionally alkali metal silicate additionally dispersed therein, and an additional covering layer of an alkali metal silicate is applied. The quantity of the alkali metal silicate in the solid covering layer amounts to up to 5% by wt., preferably up to 2% by wt. of the weight of the alkali metal peroxy salt particles to be coated. This additional covering layer of alkali metal silicate can be applied by any conventional process, for example in a Lodige (plow share) mixer, in a fluid bed process or in a ring layer mixer. The above-mentioned conditions apply in the same way as they do for coating the alkali metal peroxy salts with the mineral salt mixture coating layer according to the invention.

The coated alkali metal peroxy salt particles according to the invention have a desirable combination of a number of different advantages. The invention thus enables production of advantageously coated particles of peroxy compounds which are satisfactorily stabilized both against the moisture of the base components of detergents and against the residual moisture present in the alkali metal peroxy salt particles. In addition, not only does the coating layer according to the invention effectively keep away the external moisture and bind the internal moisture, but also the hydrogen peroxide which is split off easily from these compounds, particularly percarbonate. Because the liberated hydrogen peroxide is bound, it can no longer decompose to form water, with loss of active oxygen, and consequently no longer have a decomposition-promoting effect on the peroxy salt, e.g. the percarbonate. The alkali metal peroxy salts coated according to the invention, in particular the percarbonate, have a high level of stability even in the presence of the usual components of detergents such as zeolites, linear alkyl sulfonates, soaps, carboxymethyl cellulose, soda, optical brighteners etc. The water solubility and the rate of dissolution of the alkali metal peroxy salt particles coated according to the invention are not reduced by the coating of alkali metal sulfate-chloride, thereby assuring good utility.

The following examples are provided to illustrate the invention in further detail without limiting its scope.

EXAMPLE 1

The following process was used for the preparation of sample quantities of PCS particles coated according to the invention:

162 g of a coating agent with the following composition were added to 1,000 g sodium percarbonate (PCS) prepared according to one of the processes described in Published United Kingdom Patent Application No. 1,469,352 in a Lodige mixer (Type MSR) at a rate of operation of the mixing device of 200 rpm from a dropping funnel within an addition period of 30–60 seconds. 1,000 g of the coating agent used above consisted of 675 g water, 295 g sodium sulfate and 30 g sodium chloride. During application, the coating agent had a temperature of 40°–50° C.

Additional mixing took place for 60 seconds, the moist product was then removed from the mixer and dried in a smooth fluid bed dryer with an input air temperature of 100°–115° C. and a discharge air temperature of 70° C. The coated sodium percarbonate product thus prepared had the properties indicated in Table 1, No. E 4.

The production of fairly large quantities of the PCS particles coated according to the invention was carried out in a ring layer mixer with subsequent drying in a fluid bed dryer under conditions comparable to those indicated above.

EXAMPLE 2

In the same way as in example 1, further coated sodium percarbonate products were prepared. For this purpose, the molar ratio of sodium sulfate to sodium chloride and the degree of coating were varied. In addition, a sodium percarbonate product with a coating of sodium sulfate/potassium chloride was prepared. The coating agents contained (based on 1,000 g) 675 g water and had the following salts content: $Na_2SO_4/NaCl$: 230 g/95 g (E. 1); 295 g/30 g (E.2, E.3, E.5); 309 g/16 g (E.6); salt content $Na_2SO_4/KCl$: 287 g/38g (E. 7).

According to another variation of the invention, the sodium percarbonate particles were coated with a sodium sulfate/sodium chloride coating which additionally contained water glass with a molar ratio of $Na_2O:SiO_2=3.5$. The weight ratio of sodium sulfate/sodium chloride to water glass was 75% by weight to 25% by weight. The coating agent had the following composition, based on 1,000 g: 750 g of the coating agent according to example 1 and 250 g water glass (76 g/kg $Na_2O$, 258 g/kg $SiO_2$).

According to another variation of the invention, the sodium percarbonate particles were first coated with a coating layer of sodium sulfate and sodium chloride according to example 1 (degree of coating approximately 3.75% by wt.) and subsequently with an additional covering layer of water glass with an $Na_2O: SiO_2$ molar ratio of 3.5 (degree of coating approx. 1.25% by wt.). The coating conditions were selected in such a way that, overall, a degree of coating of 5% by wt. was obtained and the weight ratio of sodium sulfate/sodium chloride to water glass (based on the solid) was 75% by wt. to 25% by weight.

The properties of the coated sodium percarbonate products prepared in this way are summarized in Table I.

TABLE I

Production of PCS particles coated according to the invention in accordance with Examples 1 and 2.

| No. | Coating Material | Molar Ratio | Solids content in % by wt., coating agent | Degree of coating in % by wt. |
|---|---|---|---|---|
| E. 1 | $Na_2SO_4/NaCl$ | 1.1 | 32.5 | 5 |
| E. 2 | (=a) | 4:1 | 32.5 | 1.25 |
| E. 3 | | | | 2.5 |
| E. 4 | | | | 5 |
| E. 5 | | | | 7.5 |
| E. 6 | | 8:1 | 32.5 | 5 |
| E. 7 | $Na_2SO_4/KCl$ | 4:1 | 32.5 | 5 |
| E. 8 | $Na_2SO_4/NaCl$ (=a), 75% by wt. and | a → 4:1 | 32.7 | 5 (total) |
| | water glass (=b), 25% by wt. | b → 3.5 | | |
| E. 9 | 1. $Na_2SO_4/NaCl$ (=a), 75% by wt. subsequently | a → 4:1 | a → 32.5 | 5 (total) |
| | 2. water glass (=b). 25% by wt. | b → 3.5* | b → 33.4 | |

EXAMPLE 3

To assess the storage stability and the stability characteristics, heat flow measurements (LKB measurements) were carried out on sodium percarbonate products coated according to the invention and prepared in examples 1 and 2. In the case of these heat flow measurements, the heat flows occurring under isothermic measuring conditions provide indications of the stability of the product containing activity oxygen. In particular, the stability of the product in the presence of detergent components can be determined if the heat flow measurements are carried out on specimens in which the product containing active oxygen is present in mixture with the detergent components. For the heat flow measurements carried out, the PCS products coated according to the invention were therefore introduced into a base detergent in such an amount that the active oxygen content was 2 %. The base detergent used was a standard detergent free from active oxygen, based on zeolite, the components of which consisted of the usual quantities of zeolite, linear alkyl sulfonates (LAS), soap, carboxymethyl cellulose (CMC), soda and optical brighteners. The heat flow measurements carried out on these samples were carried out in an LKB 2277 bio activity monitor at 40° C. over a period of 20 hours.

For comparison with the specimens according to the invention, heat flow measurements were similarly carried out on sodium percarbonate products according to the state of the art which were carried out with sodium carbonate or sodium carbonate/sodium sulfate (molar ratio 2.5:1; degree of coating 2.5 and 3% by wt.). The heat flow values measured in each case are indicated in µW/g in Table II. The lower the heat flow measured, the higher is the stability of the product containing active oxygen in the base detergent and the more advantageous is the coating of the coated PCS particles.

TABLE II

Heat flow measurements on coated PCS particles in base detergent according to Example 3.

| No. | Coating (Molar Ratios) | Degree of Coating in % by Weight | Heat Flow in µW/g |
| --- | --- | --- | --- |
| E. 1 | Na$_2$SO$_4$/NaCl (1:1) | 5 | 20 |
| E. 2 | (4:1) | 1.25 | 23 |
| E. 3 | (4:1) | 2.5 | 24 |
| E. 4 | (4:1) | 5 | 18 |
| E. 5 | (4:1) | 7.5 | 15 |
| E. 6 | (8:1) | 5 | 17 |
| E. 7 | Na$_2$SO$_4$/KCl | 5 | 15 |
| E. 8 | Na$_2$SO$_4$/NaCl/ water glass | 5 | 16 |
| E. 9 | 1. Na$_2$SO$_4$/NaCl | 5 | 22 |
| C. 1 | Na$_2$CO$_3$ | 6 | 54 |
| C. 2 | Na$_2$CO$_3$/Na$_2$SO$_4$ (2.5:1) | 2.5 | 25–56 |
| C. 3 | Na$_2$CO$_3$/Na$_2$SO$_4$ (2.5:1) | 3 | 42–55 |

E = Examples according to the invention
C = Examples according to the prior art

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Coated alkali metal peroxy salt particles comprising:

a nucleus which consists essentially of at least one alkali metal peroxy salt selected from the group consisting of peroxycarbonates, peroxypyrophosphates, peroxytripolyphosphates and peroxymonosulfates, and a coating layer surrounding the nucleus, said coating layer consisting essentially of a mineral salt mixture formed by co-crystallization of alkali metal sulfate and alkali metal chloride in a molar ratio of from 1:1 to 8:1.

2. Coated alkali metal peroxy salt particles according to claim 1, wherein said alkali metal peroxy salt is a peroxycarbonate salt.

3. Coated alkali metal peroxy salt particles according to claim 2, wherein said alkali metal peroxy salt is sodium percarbonate.

4. Coated alkali metal peroxy salt particles according to claim 1, wherein said alkali metal sulfate and said alkali metal chloride are sodium or potassium salts.

5. Coated alkali metal peroxy salt particles according to claim 1, wherein said coating layer comprises alkali metal sulfate and alkali metal chloride in a molar ratio of from 3:1 to 5:1.

6. Coated alkali metal peroxy salt particles according to claim 1, wherein said coating layer comprises an amount of said salt mixture corresponding to from 1 to 10% by wt. of said alkali metal peroxy salt.

7. Coated alkali metal peroxy salt particles according to claim 6, wherein said coating layer comprises an amount of said salt mixture corresponding to from 3 to 8% by wt. of said alkali metal peroxy salt.

8. Coated alkali metal peroxy salt particles according to claim 1, wherein said coating layer further contains up to 50% by wt. of dispersed alkali metal silicate.

9. Coated alkali metal peroxy salt particles according to claim 8, wherein said coating layer further contains up to 25% by wt. of dispersed alkali metal silicate.

10. Coated alkali metal peroxy salt particles according to claim 1, further comprising an additional outer covering layer of alkali metal silicate containing an amount of alkali metal silicate corresponding to up to 5% by wt. of said alkali metal peroxy salt.

11. Coated alkali metal peroxy salt particles according to claim 10, wherein said outer covering layer contains an amount of alkali metal silicate corresponding to up to 2% by weight of said alkali metal peroxy salt.

12. A detergent composition comprising an effective bleaching amount of a stabilized alkali metal peroxy salt according to claim 1, and at least one conventional detergent ingredient.

13. A bleaching composition comprising an effective bleaching amount of a stabilized alkali metal peroxy salt according to claim 1, and at least one conventional bleaching ingredient.

* * * * *